United States Patent
Goto et al.

(10) Patent No.: US 6,588,737 B2
(45) Date of Patent: Jul. 8, 2003

(54) FLUID-FILLED ACTIVE VIBRATION DAMPING DEVICE AND METHOD OF PRODUCING THE SAME

(75) Inventors: Katsuhiro Goto, Inuyama (JP); Kazuhiko Kato, Komaki (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 10/033,510

(22) Filed: Dec. 27, 2001

(65) Prior Publication Data

US 2002/0053764 A1 May 9, 2002

(30) Foreign Application Priority Data

Dec. 28, 2000 (JP) ........................................ 2000-400983

(51) Int. Cl.⁷ ................................................ F16F 13/00
(52) U.S. Cl. .............................. 267/140.14; 267/140.15
(58) Field of Search ........................ 267/140.11, 140.12, 267/140.13, 140.14, 140.15, 219

(56) References Cited

U.S. PATENT DOCUMENTS

| | | | | |
|---|---|---|---|---|
| 4,650,170 A | * | 3/1987 | Fukushima | 267/140.14 |
| 4,693,455 A | | 9/1987 | Andra | 267/140.1 |
| 5,318,283 A | * | 6/1994 | Weltin et al. | 267/140.14 |
| 5,333,846 A | * | 8/1994 | Goto et al. | 267/140.14 |
| 5,344,129 A | * | 9/1994 | Ide et al. | 267/140.14 |
| 5,427,362 A | | 6/1995 | Schilling et al. | 267/140.14 |
| 5,529,295 A | | 6/1996 | Leibach et al. | 267/140.15 |
| 5,718,417 A | | 2/1998 | Aoki | 267/140.14 |
| 5,718,418 A | | 2/1998 | Gugsch | 267/140.14 |
| 6,059,275 A | * | 5/2000 | Muramatsu | 267/140.14 |
| 6,105,943 A | | 8/2000 | Nagasawa | 267/140.14 |
| 6,135,250 A | * | 10/2000 | Forster et al. | 188/266.5 |
| 6,254,069 B1 | | 7/2001 | Muramatsu et al. | 267/140.14 |
| 6,325,364 B1 | * | 12/2001 | Muramatsu | 267/140.14 |

FOREIGN PATENT DOCUMENTS

| | | | |
|---|---|---|---|
| EP | 0 945 643 A2 | 9/1999 | ............ F16F/15/02 |
| GB | 2346426 A | 9/2000 | ............ F16F/13/26 |
| JP | 2-42228 | 2/1990 | ............ F16F/13/00 |
| JP | 6-264955 | 9/1994 | ............ F16F/13/00 |
| JP | A-8-289524 | 1/1996 | ............ F16F/15/03 |
| JP | 10-47426 | 2/1998 | ............ F16F/13/26 |
| JP | 11-247919 | 9/1999 | ............ F16F/13/26 |
| JP | 11-257414 | 9/1999 | ............ F16F/13/14 |
| JP | 11-351313 | 12/1999 | ............ F16F/13/26 |

\* cited by examiner

Primary Examiner—Jack Lavinder
Assistant Examiner—Benjamin A. Pezzlo
(74) Attorney, Agent, or Firm—Rossi & Associates

(57) ABSTRACT

A fluid-filled active vibration damping device comprising an elastic body elastically connecting a first and a second mounting member and partially defining a fluid chamber filled with a non-compressible fluid, an oscillating member partially defining the fluid chamber and being reciprocatory movable in order to control a pressure of the fluid in the fluid chamber. The above vibration damping device further includes an independently formed electromagnetic actuator for applying driving force to oscillate the oscillating member and having an oscillating sleeve member fixedly connected to the oscillating member, and a retainer adapted to support the electromagnetic actuator with respect to the second mounting member such that the retainer fixed to the second mounting member while housing the electromagnetic actuator, while a yoke member of the electromagnetic actuator is fixed to a bottom wall portion of the retainer so as to extend through the bottom wall portion. A method of producing the fluid-filled active vibration-damping device is also disclosed.

9 Claims, 3 Drawing Sheets

FLUID-FILLED ACTIVE VIBRATION DAMPING DEVICE AND METHOD OF PRODUCING THE SAME

INCORPORATED BY REFERENCE

The disclosure of Japanese Patent Application No. 2000-400983 filed on Dec. 28, 2000 including the specification, drawings and abstract is incorporated herein by reference in its entirety.

BACKGROUND OF THE INVENTION

1. Field of the Invention

The present invention relates generally to an active vibration damping device usable for vibration dampers devices for automotive vehicles, such as an engine mount and a body mount, and capable of actively exhibiting a vibration damping effect or actively offsetting vibrations to be damped. More particularly, the present invention is concerned with a fluid-filled active vibration damping device that includes a pressure receiving chamber partially defined by an oscillating member and filled with a non compressible fluid, and an actuator adapted to oscillate the oscillating member for regulating the pressure of the non-compressible fluid in the pressure-receiving chamber so that the vibration damping device actively exhibits a desired vibration damping effect.

2. Description of the Related Art

A fluid-filed active vibration damping device is known as one type of vibration damping devices, e.g., a vibration damping mount or a vibration damping bushing, which is interposed between two members of vibration system for elastically connecting two members in a vibration damping fashion. As disclosed in JP-A-2-42228, JP-A-10-47426 and JP-A-11-247919, a known example of such a fluid-filled active vibration damping device includes a first and a second mounting member, an elastic body elastically connecting the first and the second mounting members, and partially defining a fluid chamber filled with a non-compressible fluid and adapted to receive a vibration load, an oscillating member partially defining the fluid chamber, and an electromagnetic actuator adapted to oscillate the oscillating member in order to regulate a pressure of the non-compressible fluid in the fluid chamber. The known fluid-filled active vibration damping device is adapted to apply oscillating force corresponding to vibrations to be damped between two members of the vibration system, so as to offset or absorb the vibrations to be damped, or so as to actively change spring characteristics of the vibration damping device corresponding to an input vibration so that the vibration damping device exhibits a low dynamic spring constant with respect to the input vibration. Thus, the fluid-filled active vibration-damping device is capable of exhibiting active vibration damping effects with respect to vibrations to be damped. For the above reasons, the fluid-filled active vibration-damping device has been applied to the engine mount for the automotive vehicles, for example.

In order to ensure a desired vibration damping effect of such a fluid-filled active vibration damping device, it is needed to oscillate the oscillating member at a frequency and a phase that correspond to those of the vibrations to be damped with high accuracy. To meet this requirement, the actuator may be preferably selected from an electromagnetic actuator, a voice-coil type actuator or the like. In general, the actuator may be formed independently of an mounting assembly of the vibration damping device, i.e., an intermediate assembly including the first and second mounting members, the elastic body elastically connecting the first and second mounting members, and the pressure-receiving chamber partially defined by the elastic body. This independently formed actuator is fixedly connected at its power output shaft to the oscillating member of the mounting assembly of the vibration-damping device In the conventional fluid-filled active vibration damping device as described in the above-indicated documents, the power output shaft of the actuator is fixed to the oscillating member such that the power output shaft is screwed onto a fixing bolt fixed to the oscillating member and extending coaxially with the power output shaft. However, this conventional mechanism for fixing the power output shaft to the oscillating member needs cumbersome and time-consuming operation or processes. Moreover, a reaction force of a twisting force generated upon screwing the power output shaft of the actuator to the fixing bolt fixed to the oscillating member acts on the oscillating member, possibly causing undesirable damage of the oscillating member.

Further, JP-A-6-264955 and JP-A-11-351313 disclose another type of conventional fluid-filled active vibration damping device, in which the oscillating member has a drive shaft fixedly disposed thereon so as to protrudes toward the actuator. The drive shaft of the oscillating member and the power output shaft of the actuator are superposed on each other in a radial direction perpendicular to their axial direction, and fastened together by means of a suitable fastening means, e.g., a bolt and a rivet, which extends through the drive shaft and the power output shaft in the radial direction. In this arrangement, the oscillating member is free from a problem that the oscillating member is undesirably damaged due to reaction force acting thereon upon fixing the drive shaft and the power output shaft together.

However, the conventional fluid-filled active vibration damping device disclosed in JP-A-6-264955 and JP-A-11-351313 suffers from a difficulty in providing a space enough large for executing a required operation for fastening the mutually superposed power output shaft and the drive shaft together by the bolt or rivet extending therethrough. Therefore, the conventional fluid-filled active vibration-damping device still has room for improving in terms of efficiency of manufacturing of the vibration-damping device.

In addition, the actuator used in the conventional fluid-filled active vibration damping device includes a coil to be energized which is fixed to an outer circumferential portion thereof, and an attractive member such as a permanent magnet and a magnetic member disposed within a bore of the coil. In this arrangement, an entire length of a wire winding around the coil is inevitably made long, for ensuring the sufficiently large number of winding of the coil, resulting in a high tendency toward increase of electrical resistance. As a result, the actuator suffers from deterioration of electrical efficiency thereof, so that the actuator becomes incapable of generating a desired oscillating force with high efficiency.

SUMMARY OF THE INVENTION

It is therefore one object of this invention to provide a fluid-filled active vibration damping device which is novel in construction and which makes it possible to assemble a mounting assembly of the vibration-damping device and an actuator formed independently of the mounting assembly to each other with excellent operation efficiency, and a method of producing the same.

It is another object of this invention to provide a fluid-filled active vibration damping device which is novel in construction and which is capable of efficiently generating a relatively large oscillating force with a reduced electric current applied to a coil, and a method of producing the same.

The above and/or optional objects of this invention may be attained according to at least one of the following modes of the invention. Each of these modes of the invention is numbered like the appended claims and depends from the other mode or modes, where appropriate, to indicate possible combinations of elements or technical features of the invention. It is to be understood that the principle of the invention is not limited to those modes of the invention and combinations of the technical features, but may otherwise be recognized based on the thought of the present invention that disclosed in the whose specification and drawings or that may be recognized by those skilled in the art in the light of the disclosure in the whole specification and drawings.

(1) A fluid-filled active vibration damping device comprising: (a) a first and a second mounting member which are spaced apart from each other; (b) an elastic body elastically connecting the first and second mounting members and partially defining a fluid chamber filled with a non-compressible fluid; (c) an oscillating member partially defining the pressure-receiving chamber on one of opposite sides thereof; (d) an electromagnetic actuator disposed on an other one of the opposite sides of the oscillating member and adapted to oscillate the oscillating member so as to control a pressure of the non-compressible fluid in the fluid chamber, the electromagnetic actuator includes: a coil having a bore; a yoke member made of a magnetic material and disposed in the bore of the coil so as to extend through the bore and protrudes axially outwardly from axially opposite end faces of the coil so as to form circumferentially extending magnetic pole portions on axially opposite sides of the coil; an oscillating sleeve member made of a magnetic material that is disposed radially outwardly of the yoke member with a given radial spacing therebetween such that the yoke member and the oscillating sleeve member are displaceable relative to each other in an axial direction of the electromagnetic actuator, the oscillating sleeve member being adapted to form at least one annular attractive portion; and an elastic support member for elastically positioning the oscillating sleeve member and the yoke member relative to each other in the axial direction, such that the at least one annular attractive portion of the oscillating member is opposed to at least one of the magnetic pole portions in a radial direction perpendicular to the axial direction, and is offset from each other in the axial direction, when the coil is in a non-energized state, the coil being energized in order to apply an axial driving force between the yoke member and the oscillating sleeve member on the basis of a magnetic force acting between the magnetic pole portions and the annular attractive portion mutually opposed to each other in the radial direction and offset from each other in the axial direction, and (g) a cup-shaped retainer fixed to the second mounting member and adapted to accommodate the electromagnetic actuator such that the electromagnetic actuator extends in a direction in which the oscillating member is reciprocatory oscillated, the annular attractive portion is fixedly connected to the oscillating member on one of axially opposite sides of the electromagnetic actuator, and the yoke member is fixedly connected to a bottom wall portion of the retainer on an other one of the axially opposite side of the electromagnetic actuator such that the yoke member extends through the bottom wall portion of the retainer.

In the fluid-filled active vibration damping device according to this mode (1) of the invention, the electromagnetic actuator can be fixedly assembled with the second mounting member via the retainer by effectively utilizing the yoke member thereof. Namely, the electromagnetic actuator is fixedly connected to the second mounting member by means of the retainer that is fixed to the inner yoke of the electromagnetic actuator extending through the bottom wall portion thereof. This makes it possible to fix the yoke member to the second mounting member via the retainer, after the annular attractive portion is connected to the oscillating member. In other words, the operation for connecting the annular attractive portion and the oscillating member is executed before the retainer covers the electromagnetic actuator and the oscillating member. Therefore, this arrangement permits both of a simple construction of the fluid-filled active vibration damping device and an improved efficiency for manufacturing the fluid-filled active vibration damping device.

In the electromagnetic actuator of the fluid-filled active vibration damping device of this mode (1) of the invention, the yoke member assembled with the coil is disposed in the radially inner side of the actuator (i.e., in the vicinity of an axis of the actuator) and the oscillating member is disposed in the radially outer side of the actuator. In this arrangement, a total length of a wire winding around the coil is made smaller than that in the above-described conventional actuator where the coil is disposed in the radially outer side of the actuator, even if the number of the winding of these coils are made equal. In other words, the total length of the wire winding around the coil is made small to the number of winding of the coil. The electromagnetic actuator used in the vibration-damping device of this mode exhibits a low electric resistance of the coil, so that the electromagnetic actuator can generate magnetic force with high efficiency, upon energizing the coil. As a result, the electromagnetic actuator generates an axial oscillating force with high efficiency, thereby effectively assuring a desired oscillating force generated by the oscillation of the oscillating member.

In addition, the electromagnetic actuator used in the fluid-filled active vibration damping device of this mode, makes it possible to provide magnetic force acting portions, i.e., the magnetic pole portions and the annular attractive portion at a radially outer portion thereof. This arrangement is effective to increase a circumferential length and a resultant total area of the magnetic pole portions and the annular attractive portion, in comparison with the above-described conventional actuator in which the coil is disposed in the radially outer portion of the actuator, even if the electromagnetic actuator used in the present invention and the conventional actuator have the same overall size. Thus, the electromagnetic actuator is able to generate the axial driving force with high efficiency, whereby the fluid-filled active vibration damping device can be generate the desired oscillating force with high efficiency.

Various kinds of fixing devices or mechanisms may be employed for fixing the electromagnetic actuator to the retainer. For instance, the electromagnetic actuator and the retainer may be fixed by bolting, press fitting, calking or the like. Preferably, the electromagnetic actuator and the retainer may be fixed together by means of a fastening mechanism. Described in detail, one of axially opposite end portions of the yoke member located on the side of the bottom wall portion of the retainer, protrudes axially outwardly through the bottom wall of the retainer. An external thread is formed on the outer circumferential surface of the protruding end portion of the yoke member, to thereby form a bolt portion. A fixing nut is screwed into the bolt portion of the yoke member, thereby fastening the electromagnetic actuator and the retainer together.

(2) A fluid-filled active vibration damping device according to the above-indicated mode (1) wherein the electromagnetic actuator further includes a power output shaft that protrudes on a center axis of the vibration damping device from the annular attractive portion toward the oscillating member, and the oscillating member further includes a drive shaft that protrudes on the center axis of the vibration damping device from the oscillating member toward the electromagnetic actuator, the drive shaft and the power output shaft being superposed on each other in a direction perpendicular to the center axis of the vibration damping device and fastened together by means of an engaging shaft member extending therethrough, whereby the oscillating member and the annular attracting portion of the electromagnetic actuator are fixedly connected to each other. According to this mode (2) of the invention, the vibration-damping device is free from a problem of axial displacement of the drive shaft and the power output shaft relative to each other, while making it possible to fixedly connect the drive shaft and the power output shaft together with ease and with a simple structure. The engaging shaft member may be selected from a rivet, a bolt, a pin a fixing rod or other suitable fastening members.

(3) A fluid-filled active vibration damping device according to the above-indicated mode (1) or (2), wherein the elastic support member comprises a pair of metallic leaf springs each having a disk like shape, which are disposed on axially opposite sides of the electromagnetic actuator so as to extend in a radial direction perpendicular to an axial direction of the electromagnetic actuator between the yoke member and the oscillating sleeve member, each of the pair of metallic leaf springs being fixed at an inner peripheral portion thereof to the yoke member and at an outer peripheral portion thereof to the oscillating sleeve member. In this mode (3) of the invention, the pair of leaf springs function to allow an axial displacement of the oscillating sleeve member relative to the yoke member, while preventing or restricting a displacement of the oscillating sleeve member relative to the yoke member in a direction in which the oscillating sleeve member is eccentric or inclined to the yoke member. Thus, the presence of the pair of leaf spring enables to improve an operation stability of the electromagnetic actuator. Preferably, each of the metallic leaf springs is formed with a through hole having a desired configuration, to thereby adjust elasticity thereof in the axial direction. For instance, the each metallic leaf spring has a plurality of through holes so as to form a plurality of elastic connecting portion that cooperate to spirally extend from its outer peripheral portion to its central portion.

(4) A fluid-filled active vibration damping device according to any one of the above-indicated modes (1)–(3), wherein the yoke member includes a bore open in an end face of one of axially opposite end portions thereof that extends through and fixed to the bottom wall portion of the retainer, the bore being adapted to accommodate a lead wire connected to the coil for applying an electric current to the coil. This arrangement enables to take the lead wire connected to the coil out of the retainer with ease, and without needing an additional arrangement with respect to the retainer for taking the lead wire out of the retainer.

(5) A fluid-filled active vibration damping device according to the above-indicated mode (4), wherein the oscillating sleeve member further includes an upper wall portion disposed at one of axially opposite open end portions thereof that is located on the side of the oscillating member, the power output shaft being fixedly disposed on a central portion of the upper wall portion so as to protrude toward the oscillating member, and wherein the bore of the inner yoke member extends over an entire axial length of the inner yoke member and is opposed at one of axially opposite ends thereof located on the side of the oscillating member to the upper wall portion of the oscillating sleeve member, the one of axially opposite ends of the bore of the inner yoke member being provided with a buffing member fixed thereto. In this mode (5) of the invention, the power output shaft can be disposed on an center axis of the oscillating sleeve member so as to protrude toward the oscillating member. This makes it possible to transmit the drive force generated in the electromagnetic actuator to the oscillating member with high efficiency with a simple connecting structure. Moreover, the power output shaft formed on one of opposite sides of the upper wall portion of the oscillating sleeve member is axially opposed to the buffing member fixed to the one end of the inner yoke member located on the other side of the upper wall portion with a given axial spacing. In this arrangement, the upper wall portion of the oscillating sleeve member is brought into abutting contact with the one end of inner yoke member via the buffing member in a shock-absorbing fashion, to thereby constitute a stop mechanism for limiting an amount of displacement of the oscillating member toward the electromagnetic actuator. Namely, the stop mechanism can be advantageously realized with a simple structure by effectively utilizing the bore of the yoke member.

(6) A fluid-filled active vibration damping device according to the above-indicated modes (1)–(5), wherein the second mounting member includes a cylindrical portion, one of axially opposite open ends of the cylindrical portion being opposed to the first mounting member with a spacing therebetween and being fluid-tightly closed by the elastic body elastically connecting the first and second mounting member together, and an other one of the axially opposite open ends of the cylindrical portion being fluid-tightly closed by a flexible diaphragm which is easily deformable, the oscillating member being axially movably supported by an axially intermediate portion of the cylindrical portion of the second mounting member such that the pressure receiving chamber partially defined by the elastic body is formed on one of axially opposite sides of the oscillating member and an equilibrium chamber partially defined by the flexible diaphragm is formed on an other one of axially opposite sides of the oscillating member, the fluid-filled active vibration damping device further comprising an orifice passage for fluid communication between the pressure receiving chamber and the equilibrium chamber and a connecting member fluid-tightly fixed to and extending through the flexible diaphragm, and wherein the electromagnetic actuator is disposed on one of opposite sides of the flexible diaphragm remote from the equilibrium chamber, and the retainer supporting the electromagnetic actuator is fixed at an open end portion thereof to the other one of the axially opposite open end of the cylindrical portion of the second mounting member, while the connecting member is fixed at one of opposite end portions thereof protruding toward the equilibrium chamber to the oscillating member and at an other one of opposite end portions protruding toward the electromagnetic actuator to the oscillating sleeve member of the electromagnetic actuator.

According to this mode (6) of the invention, the fluid-filled active vibration damping device is capable of effectively adjusting or controlling a pressure change of the fluid in the pressure receiving chamber upon application of a vibrational load to the device passively and/or actively, by utilizing resonance of the fluid flowing through the orifice passage on the basis of the pressure difference between the pressure receiving chamber and the equilibrium chamber. Thus, the fluid-filled active vibration-damping device of this mode (6) can exhibit a further improved vibration damping capability. In addition, the connecting member fluid-tightly extending through the flexible diaphragm is utilized for connecting the oscillating member and the electromagnetic actuator that are disposed on the opposite sides of the equilibrium chamber. This arrangement is effective to realize an oscillating mechanism for oscillating the oscillating member by utilizing the electromagnetic actuator, while assuring excellent fluid-tight sealing of the equilibrium chamber.

In the fluid-filled active vibration damping device of the above-mode (6), the presence of the connecting member ensures that the output shaft of the electromagnetic actuator and the oscillating member are firmly and fixedly connected to each other, even if the equilibrium chamber interposed between the oscillating member and the power output shaft of the electromagnetic actuator. Namely, the drive force generated by the electromagnetic actuator is directly transmitted to the oscillating member via the rigid connecting member, not via the flexible diaphragm and the fluid. Thus, the fluid-filled active vibration damping device permits an improved power transmitting efficiency between the electromagnetic actuator and the oscillating member and a resultant improved accuracy of control of the oscillation of the oscillating member.

In the fluid-filled active vibration damping device of the mode (6), the oscillating member and the connecting member are formed independently of each other. This makes it possible to form the an oscillating rubber support adapted to elastically support the oscillating member to the cylindrical portion of the second mounting member independently of the flexible diaphragm integrally bonded to the connecting member in the process of vulcanization of a rubber material for forming the flexible diaphragm. For the above reason, the oscillating rubber support and the flexible diaphragm can be independently arranged with a high degree of freedom in selecting materials, configurations, and other properties.

(7) A method of producing a fluid-filled active vibration damping device constructed according to any one of the above-indicated modes (1)–(7), wherein the first and second mounting member and the elastic body and the fluid chamber cooperate to form a mounting assembly of the vibration damping device, the method comprising the steps of: preparing the mounting assembly and the electromagnetic actuator independently of each other; fixedly connecting the oscillating sleeve member of the electromagnetic actuator to the oscillating member of the mounting assembly; assembling the retainer with respect to the electromagnetic actuator such that the retainer is disposed radially outwardly of the electromagnetic actuator; and then fixing the retainer to a fixing member of the second mounting member and the yoke member of the electromagnetic actuator to the bottom-wall portion of the retainer such that the yoke member extends through the bottom wall portion of the retainer.

According to the method of producing the fluid-filled active vibration damping device of this invention, the oscillating sleeve member of the independently formed electromagnetic actuator is fixedly connected to the oscillating member of the mounting assembly, initially. Subsequently the retainer is fixed to the mounting assembly, while the yoke member of the electromagnetic actuator is fixed to the retainer. That is, the electromagnetic actuator can be supported by the mounting assembly via the retainer. It should be appreciated that the present method makes it possible to easily perform an operation for fixedly connecting the oscillating sleeve member of the electromagnetic actuator to the oscillating member of the mounting assembly, before the retainer covers the electromagnetic actuator and the oscillating member. Therefore, the present method makes it possible to form a desired fluid-filled active vibration-damping device with ease and with excellent efficiency for manufacture. In the present mode (7) of the invention, the mounting assembly should be interpreted to mean an intermediate assembly of the fluid-filled active vibration damping device, which does not includes the electromagnetic actuator and the retainer, and which includes the fluid chamber filled with the non-compressible fluid whose pressure varies upon application of a vibrational load to the intermediate assembly.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
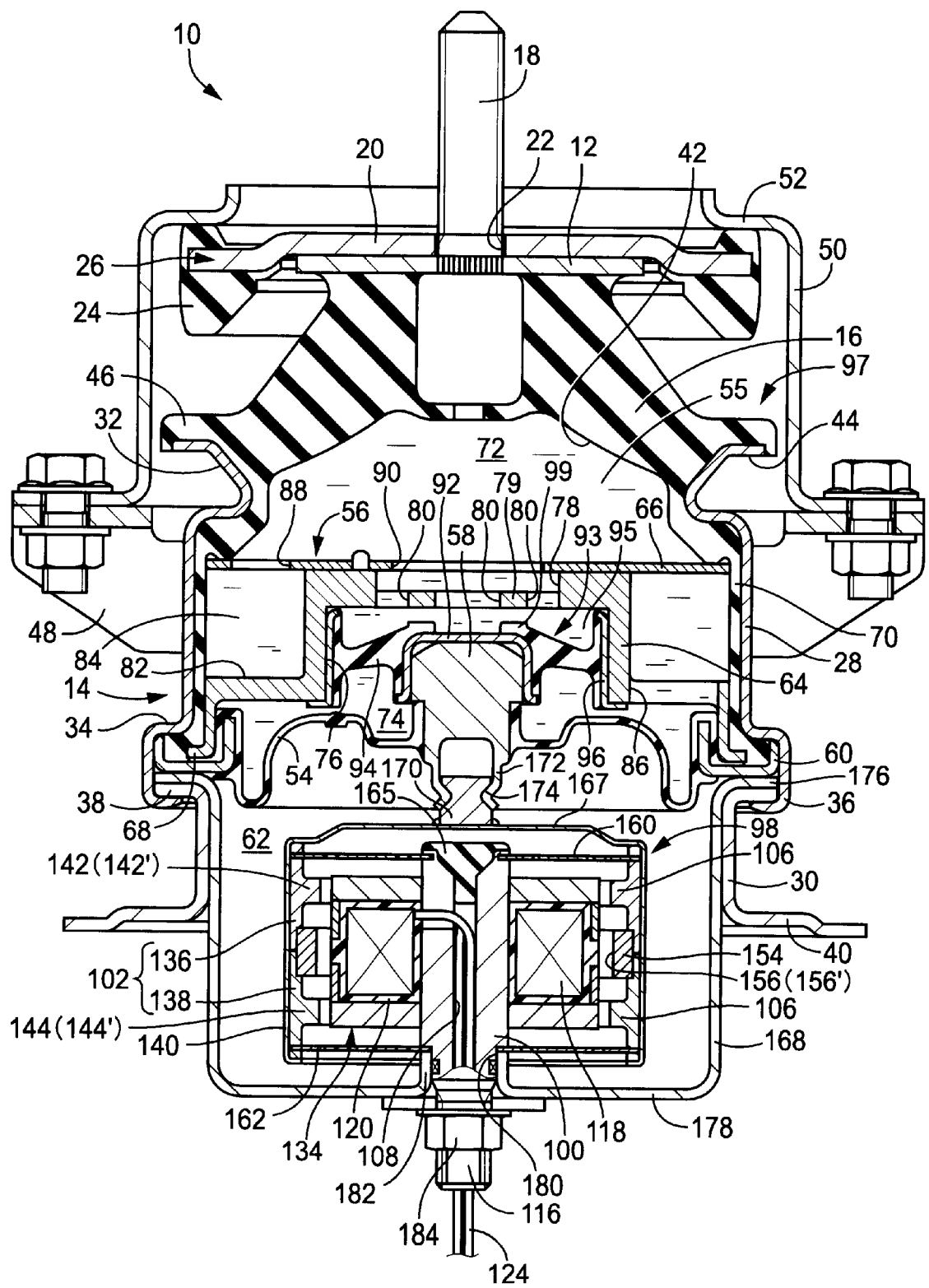
FIG. 1 is an elevational view in axial or vertical cross section of a fluid-filled active vibration-damping device in the form of an engine mount for an automotive vehicle, which is constructed according to one preferred embodiment of the invention.

Referring first to FIG. 1, an engine mount 10 shown therein is a fluid-filled active vibration-damping device constructed according to a first embodiment of this invention. This engine mount 10 is used on an automotive vehicle, for mounting a power unit (not shown) on a body (not shown) of the vehicle in a vibration damping fashion. The engine mount includes a first mounting member 12 and a second mounting member 14 which are both made of metal and which are disposed in mutually opposed and spaced-apart relationship with each other. These first and second mounting members 12, 14 are elastically connected to each other by an elastic body 16 made of a rubber material and interposed therebetween. The first and second mounting members 12, 14 are adapted to be attached to the power unit and the body of the vehicle, respectively, so that the power unit is mounted on the vehicle body via the engine mount 10 in the vibration damping fashion. With the engine mount 10 installed on the vehicle, the weight of the power unit acts on the elastic body 16, so that the elastic body 16 is elastically compressed in the vertical direction, and the first and second mounting members 12, 14 are displaced toward each other by a given distance in an axial direction of the engine mount 10 which is substantially parallel to the vertical direction as seen in FIG. 1. In this condition, a primary vibrational load to be damped acts on the engine mount 10 in the vertical direction in which the first and second mounting members 12, 14 are displaced toward and away from each other. This axial or vertical direction will be referred to as "a primary load-receiving direction" where appropriate. In the following description, the terms "upper" and "lower" are basically used on the basis of the vertical or elevational direction of FIG. 1.

More specifically described, the first mounting member 12 is a generally circular disk-shaped member extending in the horizontal direction as seen in FIG. 1, and has a center hole formed through a generally central portion thereof. A mounting bolt 18 is press-fitted into the center hole of the first mounting member 12 so as to protrude upwardly from the first mounting member 12 in the axial direction of the engine mount 10. A disk-shaped metallic stop plate 20 is press-fitted at its fixing hole 22 onto an outer circumferential surface of the bolt 18, while being closely superposed on the first mounting member 12. The stop plate 20 has an outer diameter larger than that of the first mounting member 12, so that an outer peripheral portion of the stop plate 20 protrudes radially outwardly from the first mounting member 12. The outer peripheral portion of the stop plate 20 is covered with a first rubber buffer 24 bonded thereto, thereby constitute a stop portion 26. The first mounting member 12 assembled with the stop plate 20 is fixedly attachable to the power unit (not shown) by means of the bolt 18.

The second mounting member 14 consists of a cylindrical portion in the form of a first sleeve 28 and a second sleeve 30, which are both made of metal. The first sleeve 28 is a generally cylindrical member with a relatively large diameter. The first sleeve 28 includes an axially intermediate shoulder portion 34, an axially upper small-diameter portion and an axially lower large-diameter portion located on the axially upper and lower sides of the shoulder portion 34, respectively. The first sleeve 28 has a constricted part at its upper open-end portion, so that the upper open-end portion of the first sleeve 28 is formed as a tapering connecting portion 32 which extends axially upwardly and radially outwardly. The large diameter portion of the first sleeve 28 serves as an integrally formed caulking part 36 having a cylindrical shape. Like the first sleeve 28, the second sleeve 30 is a generally cylindrical member with a relatively large diameter. The axially upper and lower end portions of the second sleeve 30 are bent radially outwardly, so as to provide an upper outward flange 38 and a lower outward flange 40 which are both integrally formed at the upper and lower end portions of the second sleeve 30. The upper and lower sleeves 28, 30 are superposed on each other in the axial direction, such that the caulking part 36 of the first sleeve 28 is caulked against the outward flange 38 of the lower sleeve 30, whereby there is provided the second mounting member 14 that has a generally cylindrical shape in its entirety. The thus formed second mounting member 14 is attachable at the lower outward flange 40 to the body of the vehicle.

The first mounting member 12 and the second mounting member 14 are disposed in a generally coaxial relationship with each other, with a suitable axial spacing therebetween. The elastic body 16 is interposed between and bonded to the first and second mounting members 12, 14, for elastically connecting the first and second mounting members 12, 14 with each other.

The elastic body 16 has a generally frusto-conical shape. In a vulcanization process of a rubber material for forming the elastic body 16, the small diameter portion of the elastic body 16 is bonded to the lower surface of the first mounting member 12, and the outer circumferential surface of the large diameter portion of the elastic body 16 is bonded to the tapering connecting portion 32 of the upper sleeve 28. Thus, there is formed an integral vulcanized intermediate assembly consisting of the first mounting member 12, the second mounting member 14 and the elastic body 16. The elastic body 16 has an inverted mortar-shaped recess 42 open in its large-diameter end face, so that it is effectively reduced or eliminated tensile stress acting on the elastic body 16 upon application of a static load or weight of the power unit to the engine mount 10.

The upper sleeve 28 has a first abutting portion 44 integrally formed at the peripheral portion of the open end of the tapering connecting portion 32 thereof. The first abutting portion 44 extends radially outwardly from the open end of the tapering connecting portion 32, such that the first abutting portion 44 is opposed to the stop portion 26 with a given spacing therebetween in the direction parallel to the axial direction of the engine mount, i.e., in the primary load receiving direction. A second rubber buffer 46 is secured to the upper surface of the first abutting portion 44. The stop portion 26 and the first abutting portion 44 are brought into elastic abutting contact with each other through the rubber buffers 26 for limiting an amount of relative displacement of the first and second mounting members 12, 14 toward each other in the axial direction, i.e., the primary load receiving direction.

On the outer circumferential surface of the upper sleeve 28, there is fixed a bracket 48 such that an annular upper plate of the bracket 48 extends radially outwardly from the outer circumferential surface of the upper sleeve 28. The bracket 48 functions to support a stop sleeve 50 which is a generally cylindrical metallic member with a relatively large diameter. The stop sleeve 50 is fixed to the annular upper plate of the bracket 48 so as to extend axially upwardly toward the first mounting member 12. That is, the stop sleeve 50 is disposed radially outwardly of the elastic body 16 with a radial spacing therebetween. The axially upper end portion of the stop member 50 is radially inwardly bent to form a second abutting part 52 that is disposed axially upward of the stop portion 26 so as to oppose to the stop portion 26 in the axial direction of the engine mount 10. The stop portion 26 and the second abutting portion 52 are brought into elastic abutting contact with each other through the first rubber buffer 24, for limiting an amount of relative displacement of the first and second mounting members 12, 14 away from each other, in the axial direction of the engine mount 10, i.e., in the primary load receiving direction.

With the elastic body 16 bonded to the first and second mounting members 12, 14 in the above-indicated vulcanization process, the axially upper opening of the second mounting member 14 is fluid-tightly closed by the elastic body 14. The second mounting member 14 houses therein a flexible diaphragm 54 and a partition structure 56 with these two members 54, 56 extending in a radial direction perpendicular to an axial direction of the second mounting member 14.

The flexible diaphragm 54 may be a thin-walled flexible rubber layer which is easily deformable. The central part of the diaphragm 54 is bonded to a metallic connecting member 58 in a vulcanization process of a rubber material for forming the flexible diaphragm 54, such that the connecting member 58 extends through the central part of the flexible diaphragm 54. The peripheral portion of the flexible diaphragm 54 is bonded to a generally annular metallic support member 60 in the above-indicated vulcanization process. The flexible diaphragm 54 is provided with a sufficient slack to facilitate elastic deformation or displacement thereof.

The support member 60 is fluid-tightly gripped by and between the upper and lower sleeves members 28, 30 by caulking at the calking part 34 of the second mounting member 14, so that the flexible diaphragm 54 is fixedly supported at its peripheral portion by the second mounting member 14. In this condition, the axially lower opening of the upper sleeve 28 of the second mounting member 14 is fluid-tightly closed by the flexible diaphragm 54, thus providing a fluid chamber 55 within the upper sleeve 28, which is partially defined by and axially disposed between the elastic body 16 and the flexible diaphragm 54, and which is fluid-tightly filled with a suitable non-compressible fluid such as water, alkylene glycol, polyalkylene glycol, or silicone oil. For effective damping of input vibrations based on resonance of the fluid, it is preferable to fill the fluid chamber with a low-viscosity fluid whose viscosity is not higher than 0.1 Pa·s. The lower sleeve 30 disposed on the axially lower side of the flexile diaphragm 54 to form therein an air chamber 62 that allows a deformation of the flexible diaphragm 54.

The partition structure 56 includes a partition body 64 and a covering member 66 which are both made of metal. The partition body 64 has a thick-walled disk-shaped member, while the covering member 58 is a thin-walled disk-shaped member. The covering member 66 is superposed on and closely fixed to the upper surface of the partition body 64. The thus constructed partition structure 56 is press-fitted into the upper sleeve 28, such that the peripheral portion of the covering member 66 is forcedly pressed onto the upper surface of the partition body 64 by the tapering connection portion 32 via the elastic body 16. The partition structure 56 has an annular radial projection 68 integrally formed at its axially lower end portion so as to protrude radially outwardly. The radial projection 68 is caulked with respect to the second mounting member 14 such that the radial projection 68 is gripped by and between the shoulder portion 34 of the upper sleeve 28 and the upper outward flange 38 of the lower sleeve 30, together with the support member 60. Thus, the partition structure 56 is fixedly assembled within the second mounting member 14. In this respect, a sealing rubber layer 70 is bonded by vulcanization to the substantially entire area of the inner circumferential surface of the upper sleeve 28, and compressed by and between the outer circumferential surface of the partition structure 56 and the inner circumferential surface of the upper sleeve 28, thereby assuring fluid-tight sealing between the partition structure 56 and the upper sleeve 28.

Therefore, the fluid chamber 55 enclosed within the upper sleeve 28 is divided by the partition structure 56 into two fluid-filled sections, namely a pressure-receiving chamber 72 partially defined by the elastic body 16 and located on the axially upper side of the partition structure 56 and an equilibrium chamber 74 partially defined by the flexible diaphragm 54 and located on the axially lower side of the partition structure 56. The pressure of the fluid in the pressure-receiving chamber 72 is changed due to the elastic deformation of the elastic body 16 upon application of a vibrational load to the engine mount 10, while the volume of the equilibrium chamber 74 is easily varied due to the deformation of the flexible diaphragm 54.

The partition body 64 has a central recess 76 open in the axially lower surface thereof, and a small diameter recess 78 open in the axially upper surface thereof. A bottom wall portion 79 partially defining both of the recess 76, 78 at its opposite surfaces is provided with a plurality of through holes 80, so that the central recess 76 and the small diameter recess 78 are held in fluid communication through the plurality of through holes 80 formed through the bottom wall portion 79. The covering member 66 has a window 90 formed through its generally central portion.

The central recess 76 of the partition body 64 functions to house an metallic oscillating plate 92. The oscillating plate 92 is an inverted cup shaped member having a bottom wall portion whose diameter is smaller than the inner diameter of the central recess 76. The oscillating plate 92 is elastically connected to a cylindrical fixing sleeve 96 disposed radially outward thereof by an annular disk shaped oscillating rubber support 94 interposed therebetween. The oscillating rubber support 94 is bonded at its inner circumferential surface to the outer circumferential surface of the oscillating plate 92 and at its outer circumferential surface to the inner circumferential surface of the cylindrical fixing sleeve 96, in the process of vulcanization of a rubber material for forming the oscillating rubber support 94. That is, the oscillating rubber support 94 cooperates with the oscillating plate 92 and the fixing sleeve 96 to provide an integral vulcanized assembly in which the oscillating plate 92 and the fixing sleeve 96 are held in a substantially concentric or coaxial relationship with each other. The fixing sleeve 96 of the integral vulcanized assembly is press-fitted into the central recess 76 of the partition body 64 so that the oscillating plate 92 is elastically supported by the partition body 64 such that the central recess 76 is fluid-tightly divided by the oscillating plate 92 and the oscillating rubber support 94 each extending in a direction perpendicular to the axial direction of the central recess 76. A rubber buffer 99 integrally formed with the oscillating rubber support 94 is bonded to the upper surface of the oscillating plate 92. With the oscillating plate 92 disposed in the central recess 76 as described above, the oscillating plate 92 is opposed to the bottom wall portion 79 of the partition body 64 with a given axial spacing therebetween. The oscillating plate 92 is brought into abutting contact with the bottom wall portion 79 via the rubber buffer 97, for limiting the relative axial movements of the oscillating plate 92 and the partition body 64. The oscillating plate 92 is press-fitted onto the axially upper end portion of the connecting member 58 to which the central portion of the diaphragm is bonded.

With the above-indicated intermediate vulcanized assembly 92, 94, 96 being assembled with respect to the partition body 64, the oscillating plate 92 and the oscillating rubber support 94 cooperate to form an oscillating member 93. The oscillating member 93 partially defines an oscillating chamber 95 formed on one of axially opposite sides thereof, i.e., the upper side thereof as seen in FIG. 1, and the equilibrium chamber 74 formed on the other side thereof, i.e., the lower side thereof as seen in FIG. 1. The oscillating chamber 95 is held in fluid communication with the pressure receiving chamber 72 through the through hole 80 and the small-diameter recess 78 of the partition body 64, and the window 90 of the covering member 66. Since fluid passages defined by the through hole 80, the recess 78 and the window 90 have sufficiently large cross sectional areas, respectively, the oscillating chamber 95 substantially functions as a part of the pressure receiving chamber 72. That is, the pressure-receiving chamber 72 includes the oscillating chamber 95 as an integral part thereof.

Further, the partition body 64 has a circumferential groove 82 disposed radially outwardly of the central recess 76 and the small-diameter recess 76 so as to extend in a circumferential direction thereof with a given circumferential distance. With partition body 76 held in close contact at its upper surface with the covering member 66 and at its outer circumferential surface with the first sleeve 28, the opening of the circumferential groove 82 is closed by the covering member 66 and the first sleeve 28. Thus, it is provided an orifice passage 84 extending in the circumferential direction with the given circumferential distance. The orifice passage 84 is held in fluid communication at one of opposite ends thereof with the equilibrium chamber 74 through a communication hole 86 formed through the partition body 64, and at the other end thereof with the pressure receiving chamber 72 through a communication hole 88 formed through the covering member 66.

In the present embodiment, the length and the cross sectional area of the orifice passage 84 is suitably determined or tuned so that the engine mount 10 exhibits a high vibration damping effect with respect to low frequency vibrations, such as engine shakes, on the basis of resonance of the fluid flowing through the first orifice passage 84.

Figure 2:
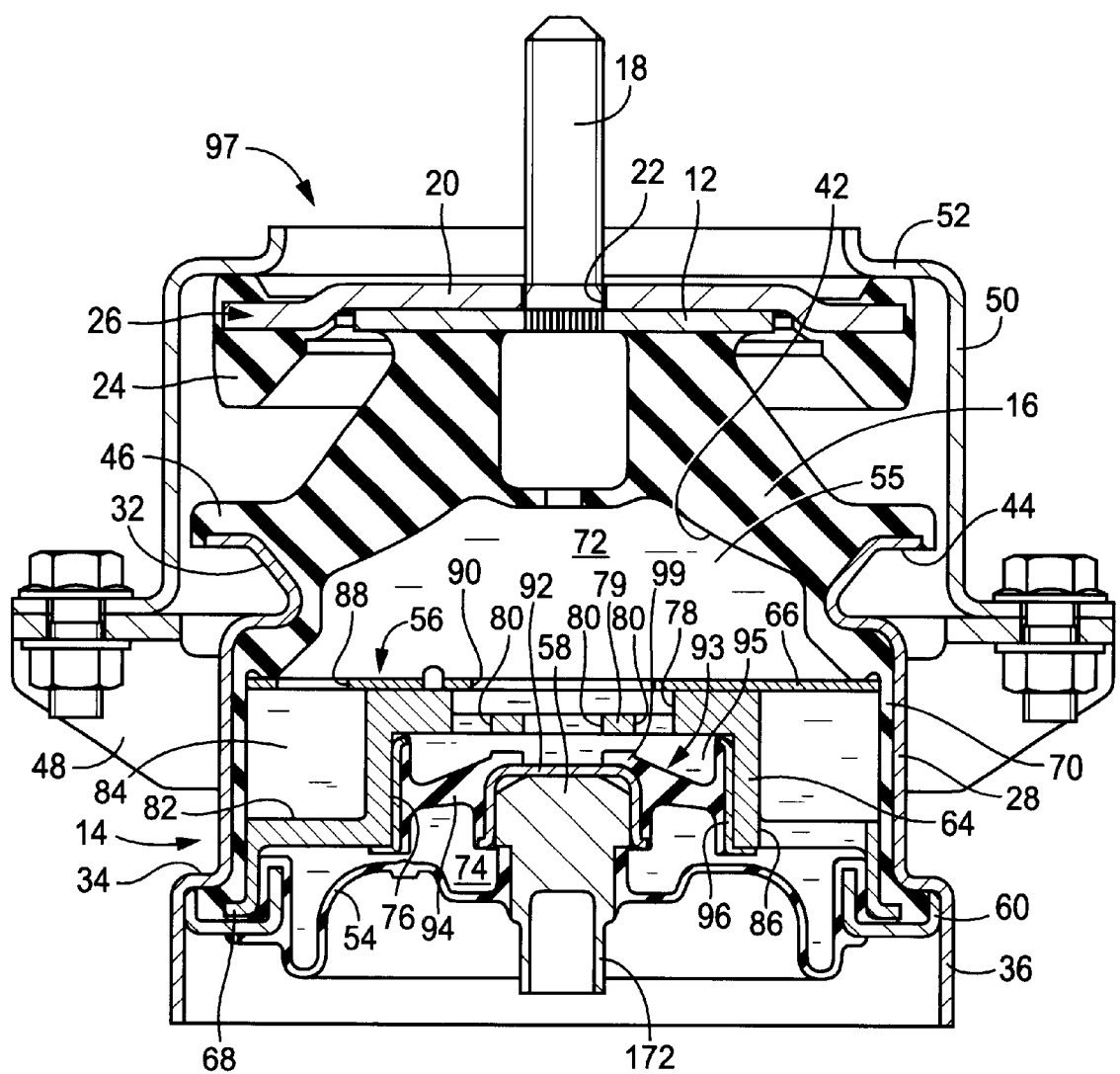
FIG. 2 is an elevational view in axial or vertical cross section of a mounting assembly of the engine mount of FIG. 1.
Figure 3:
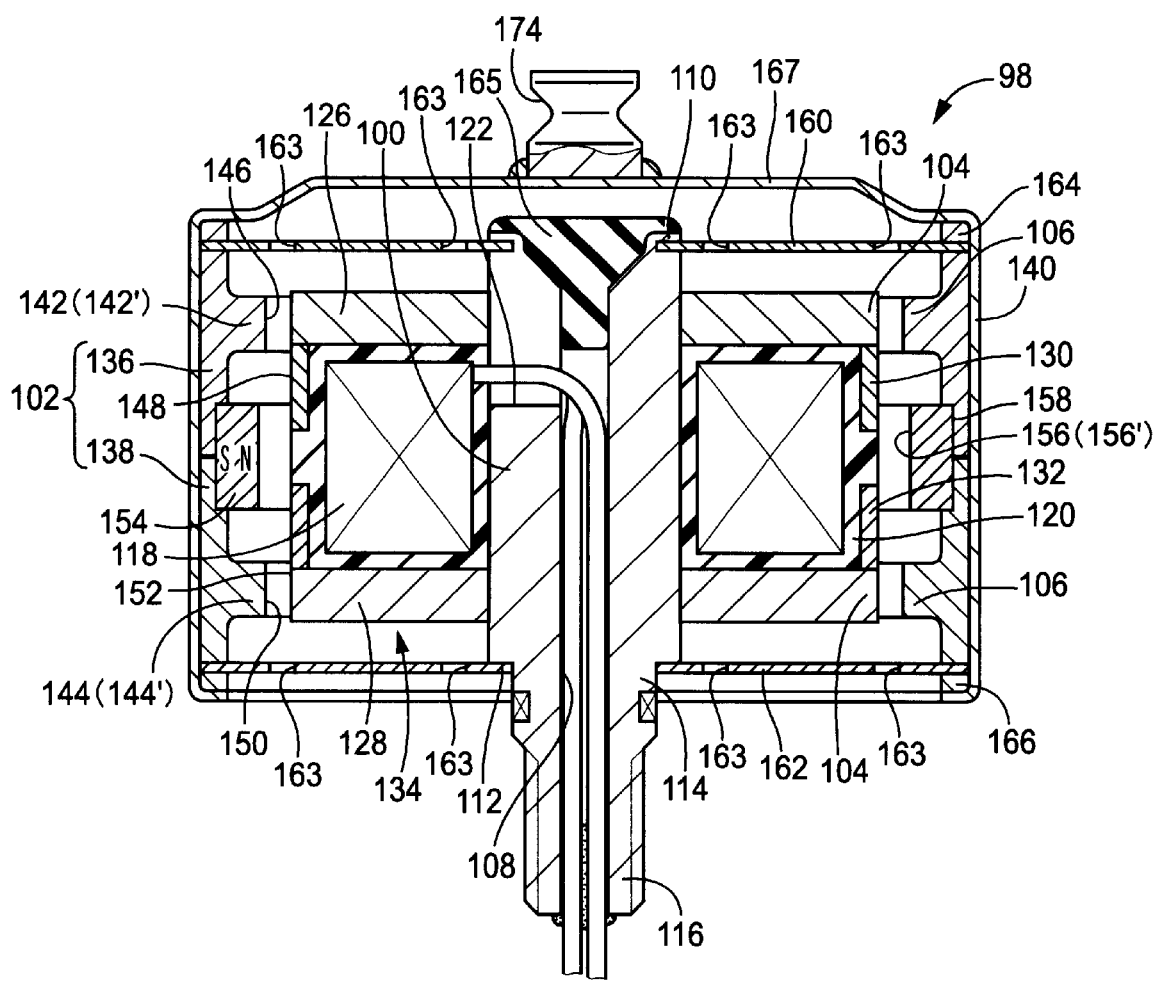
FIG. 3 is an enlarged elevational view in axial or vertical cross section of an electromagnetic actuator of the engine mount of FIG. 1.

FIG. 2 shows only a mounting assembly 97 of the engine mount 10 of the present embodiment, which includes the above described pressure receiving chamber 72 and equilibrium chamber 74. This mounting assembly 97 of the engine mount 10 is assembled with an electromagnetic actuator 98 disposed on the axially lower side thereof as seen in FIG. 1. As shown in FIG. 3, the actuator 98 includes an inner shaft member 100 and an oscillating sleeve member in the form of an outer sleeve member 102 which are disposed in a coaxial or concentric relationship with each other with a radial spacing therebetween. The inner shaft member 100 is adapted to form magnetic pole portions in the form of inner magnetic pole portions 104, while the outer shaft member 102 is adapted to form an annular attracted portion in the form of outer magnetic pole portions 106. The inner shaft member 100 and the outer sleeve member 102 are axially movable relative to each other by a force applied therebetween in the axial direction, which force is generated based on a magnetic force acting between inner magnetic pole portions 104 and the outer magnetic pole portions 106.

More specifically described, the inner shaft member 100 is a small-diameter thick-walled cylindrical member made of a ferromagnetic material such as iron, and has a bore 108 extending in its axial direction with a generally constant cross sectional area. The inner diameter of the inner shaft member 100 is made large at its axially upper end portion, so that the upper end portion of the inner shaft member 100 serves as an integrally formed caulked portion 110 with a thin-walled cylindrical shape. On the other hand, the outer diameter of the inner shaft member 100 is made small at its axially lower end portion, so that the lower end portion serves as an integrally formed cylindrical fitting part 114, and cooperates with the axially intermediate portion of the inner shaft member 100 to form therebetween a shoulder surface 112. The cylindrical fitting part 114 includes an integrally formed fixing bolt 116 protruding axially downwardly from the lower end face thereof.

An annular shaped coil 118 wound in its circumferential direction is disposed radially outwardly on the axially intermediate portion of the inner shaft member 100. The coil 118 is covered by an electrically insulative bobbin 120. Since the inner shaft member 100 is formed with a slit-like shaped cutout 122 extending axially outwardly from the intermediate portion thereof so as to open in its axially upper end face, a lead wire 124 can be disposed within the bore 108 through the axially lower end opening of the bore 108 and connected to the coil 118 through the cutout 122.

The inner shaft member 100 further includes an upper metallic plate 126 and a lower metallic plate 128, both having an thick-walled annular plate. The upper and lower metallic plates 126, 128 are disposed radially outwardly on the inner shaft member 100 such that the upper metallic plate 126 is superposed on and fixed to the axially upper end face of the coil 118, and the lower metallic plate 128 is superposed on and fixed to the axially lower end face of the coil 118. These upper and lower metallic plates 126, 128 are both made of ferromagnetic materials such as iron, and both have a inner diameter slightly larger than the outer diameter of the inner shaft member 100 and an outer diameter slightly larger than an outer diameter of the coil 118. Namely, the upper and lower metallic plates 126, 128 are assembled with the coil 118 such that the upper and lower metallic plates 126, 128 are held in abutting contact at their inner circumferential surfaces with respective axial portions of the outer circumferential surface of the inner shaft member 100, with the coil 118 interposed therebetween. The coil 118 further assembled with an upper metallic ring 130 and a lower metallic ring 132 both having a cylindrical shape and made of ferromagnetic materials. The upper and lower metallic ring 130, 132 are disposed radially outwardly on the outer circumferential surface of the coil 118 such that the upper metallic ring 130 is held in abutting contact at its axially upper end face with the outer peripheral portion of the lower end face of the upper metallic plate 126, while the lower metallic ring 132 is held in abutting contact at its axially lower end face with the outer peripheral portion of the upper end face of the lower metallic plate 128. Namely, the upper and lower metallic rings 130, 132 are protrudes axially inwardly from the outer peripheral portions of the upper and lower metallic plates 126, 128, while being fitted onto respective axial portions of the outer circumferential surface of the coil 118. The axially inward protruding end faces of the upper and lower metallic rings 130, 132 are opposed to each other with a part of the bobbin 120 interposed therebetween for a given axial distance.

Accordingly, the inner shaft member 100, the upper and lower metallic plates 126, 128 and the upper and lower metallic rings 130, 132 are cooperate to form a yoke member in the form of an inner yoke member 134 that covers around the coil 118 and extends in the circumferential direction of the coil 118 over an entire circumference of the coil 118 with a constant "C" like shape in cross section of the coil 62 and which are spaced apart from each other in the axial direction. When the coil 118 is energized by applying an alternating or pulsating electric current through the lead wire 124, magnetic fields are produced owing to magnetic effect of the electric current through the coil, so that the coil 62 functions as an electromagnet. Namely, axially opposite outer circumferential portions of the yoke member 134 are alternately magnetized to opposite magnetic poles depending upon directions of the electric current applied to the coil 118. More specifically described, when the coil 118 is energized in one direction, one of opposite magnetic poles e.g., N is given to the outer circumferential portion of the upper metallic plate 126 and the upper metallic ring 130, while the other magnetic pole, e.g., S is given to the outer circumferential portion of the lower metallic plate 128 and the lower metallic ring 132. On the other hand, when the coil 118 is energized in the opposite direction, these given magnetic poles are reversed. Therefore, the inner yoke member 134 provides opposite magnetic poles at axially opposite outer circumferential portions one of which consists of the outer circumferential portion of the upper metallic plate 126 and the upper metallic ring 130 (hereinafter referred to as "upside inner magnetic pole portion 148), and the other of which consists of the outer circumferential portion of the lower metallic plate 128 and the lower metallic ring 132 (hereinafter referred to as "downside inner magnetic pole portion 152). Since these upside and downside magnetic pole portions 148, 152 are electrically insulated by the corresponding portion of the bobbin 120 axially interposed therebetween, a magnetic path formed through the inner yoke member 134 is opened by a magnetic gap formed between the upside and downside magnetic pole portions 148, 152 of the inner yoke member 134.

On the other hand, the outer sleeve 102 as the oscillating sleeve member consists of an upper and a lower cylindrical outer yoke members 136, 138 which are both made of ferromagnetic materials, such as iron. These outer yoke members 136, 138 have a large-diameter generally cylindrical shape, and are disposed in a coaxial relationship and are directly superposed on each other in the axial direction. These upper and lower outer yoke member 136, 138 are fixedly supported by a cover member 140 in the form of an inverted cylindrical cup shaped metallic member, such that the upper and lower outer yoke member 136, 138 are press-fitted into a bore of the cover member 140 with outer circumferential surfaces of the outer yoke members 136, 138 held in close contact with an inner circumferential surface of an cylindrical wall portion of the cover member 140.

These upper and lower outer yoke members 136, 138 have at their axially central portions respective annular projections 142, 144, each protruding radially inwardly and extending continuously in its circumferential direction with an approximately constant cross sectional area. That is, the outer sleeve member 102 includes the annular projections 142, 144 which are opposed to each other with a given axial distance therebetween. When the coil 118 is in a non-energized state, i.e., in a neutral relative position of the inner shaft member 100 and the outer sleeve member 102, the annular projection 142 is positioned to be radially opposed to and axially offset from the upside inner magnetic pole portion 148 of the inner yoke member 134 with a given radial spacing therebetween, while the annular projection 144 is positioned to be radially opposed to and axially offset from the downside inner magnetic pole portions 152 of the inner yoke member 134 with a given radial spacing therebetween.

An inside diameter of the upper outer yoke members 136 is increased at its axially lower end portion and an inside diameter of the lower outer yoke member 138 is increased at its axially upper end portion, so that the outer sleeve member 102 has an annular groove formed in its axially central portion and open in its inner circumferential surface. An annular permanent magnet 154 is fitted into the annular groove of the outer sleeve member 102. In this condition, an outer circumferential surface of the permanent magnet 154 is held in abutting contact with the inner surface of the annular recess of the outer sleeve member 102, while the inner circumferential surface of the permanent magnet is substantially aligned in the axial direction with inner circumferential surfaces 146, 150 of the annular protrusions 142, 144 as seen in the vertical direction of FIG. 3. When the coil 118 is in the non-energized state as described above, the inner surface of the permanent magnet 154 is positioned to be opposed to the axially central portion of the bobbin 120 axially interposed between the upside and downside inner magnetic pole portions 148, 152 with a given radial spacing therebetween.

The permanent magnet 154 is magnetized in the radial direction thereof. For instance, a magnetic pole N is given in the inner circumferential surface of the permanent magnet 154, and a magnetic pole S is given in the outer circumferential surface of the permanent magnet 154, in the present embodiment. With the permanent magnet 154 fixedly assembled with the outer sleeve member 102 as described above, the upper and lower outer yoke members 136, 138 are held in contact with the magnetic pole S of the permanent magnet 154. Therefore, the magnetic pole S is given to the annular protrusions 142, 144 of the upside and lower outer yoke members 136, 138, while the magnetic pole N is given to the inner circumferential surface of the permanent magnet 154. Namely, the permanent magnet 154 and the outer sleeve member 102 cooperate to form a magnetic path. It should be appreciated that the inner circumferential surface 156 of the permanent magnet 154 and inner circumferential surfaces of the annular projections 142, 144 function as three outer magnetic pole portions 156', 142', 144' which are spaced from one another in the axial direction.

The inner shaft member 100 and the outer sleeve member 102 are elastically connected by means of an elastic support member in the form of a pair of leaf springs 160, 162. The pair of leaf springs 160, 162 are disposed at axially opposite end portions of the inner shaft member 100 and the outer sleeve member 102, and extend in a radial direction perpendicular to the axial direction between the inner shaft member 100 and the outer sleeve member 102. Each of the leaf springs 160, 162 is a thin-walled disk-like member made of spring steel, and has a plurality number of spiral through holes 163 each extending spirally from the inner shaft member 100 toward the outer sleeve member 102, to thereby adjust spring characteristics thereof in the axial direction. The leaf spring 160 is firmly fixed at its inner peripheral portion to the axially upper end portion of the inner shaft member 100, with the inner peripheral portion of the leaf spring 160 caulked against the caulking part 110, and at its outer peripheral portion to the axially upper end portion of the outer sleeve member 102 with the outer peripheral portion gripped by and between the axially upper end face of the upper outer yoke member 136 and an upper fixing ring 164. On the other hand, the leaf spring 162 is firmly fixed at its inner peripheral portion to the axially lower end portion of the inner shaft member 100, with the inner peripheral portion of the leaf spring 162 gripped by and between the shoulder surface 112 and a retainer casing (which will be described later), and at its outer peripheral portion to the axially lower end portion of the outer sleeve member 102 with the outer peripheral portion gripped by and between the axially lower end face of the lower outer yoke member 138 and an lower fixing ring 166.

With the inner shaft member 100 and the outer sleeve member 102 elastically connected with each other by means of the pair of leaf springs 160, 162 as described above, the inner shaft member 100 and the outer sleeve member 102 are elastically movable relative to each other in the axial direction thereof. In a static or initial state of the actuator 98 where no electric current applied to the actuator 98, the inner shaft member 100 and the outer sleeve member 102 are positioned relative to each other as described above. In other words, centers of the inner shaft member 100 and the outer sleeve member 102 in the axial direction are held in the same axial position. A buffer in the form of the elastic cap 165 is firmly fitted into the axially upper open-end portion of the inner shaft member 100, and opposed to an upper wall of the metallic cover 140 with a given axial spacing therebetween. In this arrangement, the elastic cap 165 is brought into abutting contact with the upper wall 167 of the metallic cover 140, for limiting an amount of relative axial displacement of the inner shaft member 100 and the outer sleeve member 102 owing to the elastic deformation of the leaf springs 160, 162, in a shock absorbing fashion.

An operation of the electromagnetic actuator 98 constructed as described above will be described in detail. When the coil 118 is held in its de-energized state, the upside and downside inner magnetic pole portions 148, 152 are not given magnetic poles, and the inner shaft member 100 and the outer sleeve member 102 are held in the predetermined neutral axial position of FIG. 3 by equilibrium of static magnetic force acting between the outer magnetic pole portions 156', 142', 144' and the upside and downside inner magnetic pole portions 148, 152 on the basis of the opposite magnetic poles N and S given to the outer magnetic pole portions 156', 142', 144', and an elastic force generated by the leaf springs 160, 162. If the equilibrium is lost due to a relative axial movement of the inner shaft member 100 and the outer sleeve 104 from the neutral position while the coil 118 is in the non-energized state, the inner shaft member 114 and the outer sleeve 102 are returned to the neutral position for restoring the equilibrium. That is, a magnetic axial driving force is applied between the inner and outer sleeves 12, 14 for restoring the equilibrium and the neutral position thereof.

When the coil 118 is energized, on the other hand, the opposite magnetic poles are alternately given to the respective upside and downside magnetic pole portions 148 and 152. As a result, the equilibrium of the static magnetic force is lost, and the magnetic axial driving force is applied between the inner shaft member 100 and the outer sleeve member 102 on the basis of the magnetic force acting between the upside and downside inner magnetic pole portions 148, 152, and the outer magnetic pole portions 156', 142' 144'. The direction of the magnetic axial driving force is changed depending upon the directions of the electric current applied to the coil 118. In view of this, an alternating current, a pulsating current, a pulse current or the like may be applied to the coil 118 so that the inner shaft member 100 and the outer sleeve member 102 are axially oscillated relative to each other, thus generating oscillating force in the axial direction.

The electromagnetic actuator 98 constructed as described above is assembled with the mounting assembly 97 of the engine mount 10 such the electromagnetic actuator 98 is disposed downward of the oscillating member 93 and the equilibrium chamber 74. The electromagnetic actuator 98 further includes an output shaft in the form of the output rod 170. The output rod 170 is made of metal and is fixed by welding to the central portion of the upper surface of the metallic cover 140 so as to protrude axially upwardly from the upper surface of the metallic cover 140 with a substantially constant circular cross sectional shape. The output rod 170 is disposed coaxially with and axially opposed to the connecting member 58 that is fitted into the oscillating plate 92. The connecting member 58 includes a drive shaft in the form of a drive rod 172 integrally formed at the axially lower end portion thereof. The drive rod 172 has a hollow cylindrical shape and straightly extends toward the cover member 140, such that the drive rod 172 firmly fitted onto the outer circumferential surface of the output rod 170.

Described in detail, the power output rod 170 has an annular fitting groove 174 open in an outer circumferential surface thereof and extending circumferentially with a substantially constant V-shape in its cross section. The drive rod 172 is disposed radially outwardly on the power output rod 170, and is radially inwardly pressed onto the annular fitting groove 174 by caulking, for example, so that the drive rod 172 is firmly fitted onto the outer circumferential surface of the output rod 170. Thus, the power output rod 170 and the drive load 172 are firmly fixed and connected with each other.

Accordingly, the drive force generated by the electromagnetic actuator 98 is transmitted to the oscillating member 93 through the power output rod 170, the drive rod 172 and the connecting member 58. As a result, the oscillating member 93 is reciprocatory oscillated or displaced in the axial direction of the engine mount 10. In the present embodiment, the oscillating member 93 is oscillated at a suitable frequency and phase corresponding to those of vibrations to be damped, so that the pressure of the fluid filling the pressure receiving chamber can be actively controlled, thus ensuring a desired vibration damping effect of the engine mount 10.

While the electromagnetic actuator 98 is fixedly connected at its power output rod 170 to the drive rod 172 as described above, the electromagnetic actuator 98 is assembled with the mounting assembly 92 via a retainer casing 168. The retainer casing 168 is a cylindrical cup shaped member made of metal and having a large diameter. The retainer casing 168 is disposed radially outwardly of the electromagnetic actuator 98, and is fixed at its open-end portion to the mounting assembly with the electromagnetic actuator 98 housed within the retainer casing 168.

In this respect, the retainer casing 168 has an outward flange 176 integrally formed at its open end portion and a fixing bore 180 formed through a central portion of its bottom wall 178. A fixing sleeve 182 is integrally fixed to a peripheral portion of the fixing bore 180 so as to protrude axially inwardly or upwardly from the bottom wall 178 into the interior of the retainer casing 168 by a given axial distance.

The electromagnetic actuator 98 is fixed to the retainer casing 168 such that the cylindrical fitting part 114 of the inner shaft member 100 fitted into the fixing sleeve 182 and extending through the fixing bore 180, and the fixing bolt 116 of the inner shaft member 100, which protrudes axially outwardly or downwardly from the fixing bore 180 is threaded engaged with the nut 184, to thereby fasten the inner shaft member 100 to the retainer casing 168. In this condition, the electromagnetic actuator 98 is housed within the retainer casing 168, while being located coaxial relationship with the retainer casing 168. The electromagnetic actuator 98 assembled with the mounting assembly 97 as described above is operable to provide a given amount of axial displacement of the outer sleeve member 102 relative to the inner shaft member 100, owing to the elastic deformation of the leaf springs 160, 162.

The retainer casing 168 assembled with the electromagnetic actuator 98 is also fixedly assembled with the second mounting member 14 such that the outward flange 176 of the retainer casing 168 is gripped by and between the first and second sleeves 28, 31, and the calking part 36 of the first sleeve 28 is caulked against the outward flange 178. The retainer casing 168 is fixedly assembled with the second mounting member 14 while being disposed in a coaxial relationship with the mounting assembly 97 of the engine mount 97, whereby the electromagnetic actuator 98 is fixedly assembled with the second mounting member 14 and the mounting assembly 97 of the engine mount 10.

The engine mount 10 constructed as described above, may be advantageously formed according to the following one preferred example of a method of the invention. Initially, the mounting assembly 97 shown in FIG. 2 and the electromagnetic actuator 98 shown in FIG. 3 are formed independently of each other. Subsequently, the power output rod 170 of the electromagnetic actuator 98 is firmly connected to the drive rod 172 of the connecting member 58 of the mounting assembly 97 by caulking, whereby the electromagnetic actuator 98 and the mounting assembly 97 are assembled with each other. Then, the retainer casing 168 is disposed radially outwardly of the electromagnetic actuator 98, and the second sleeve 30 is disposed radially outwardly on the outer circumferential surface of the retainer casing 168 with the outward flange 176 of the retainer casing 168 and the outward flange 38 of the second sleeve 30 superposed on each other in the axial direction. The caulking part 36 of the first sleeve 28 is caulked against these outward flanges 176, 38, to thereby form the second mounting member 14 and fix the retainer casing 168 to the second mounting member 14, simultaneously. When the retainer casing 168 is fixed to the second fixing member 14, the axially lower end portion of the inner shaft member 100 of the electromagnetic actuator 98 is inserted into the fixing sleeve 182 of the retainer casing 168 such that the fixing bolt 116 protrudes axially outwardly from the retainer casing 168. The nut 184 is screwed on the fixing bolt 116, so that the inner shaft member 100 of the electromagnetic actuator 98 is fixedly supported by the second mounting member 114 via the retainer casing 168.

In the engine mount 10 constructed according to the present embodiment as described above, the electromagnetic actuator 98 is fixedly supported by the second mounting member 14 via the retainer case 168 by advantageously utilizing the inner shaft member 100 of the electromagnetic actuator 98, which serves as the yoke member. Therefore, the engine mount 10 of the present embodiment enables to firmly fixed the electromagnetic actuator 98 to the second mounting member 14 with ease and with a simple structure, thus effectively improving an efficiency of manufacture of the engine mount 10.

Further, the electromagnetic actuator 98 includes the coil 118 that is fixed to the inner shaft member 100 rather than the outer sleeve member 102, unlike a conventional damping actuator. This arrangement makes it possible to reduce a total length of the wire of the coil 118, while increasing the number of winding of the coil 118. As a result, a resistance value of the wire to flow of an electric current therethrough can be made small. Thus, the electromagnetic actuator 98 is capable of generating the oscillating force, i.e., the driving force applied to the oscillating member 93 with high efficiency.

In addition, since the coil 118 having a relatively large outer diameter is disposed on the inner shaft member 100, magnetic gaps formed between the inner magnetic pole portions 104 and the outer magnetic pole portions 106 can be located at a radially outer portion remote from a center axis of the electromagnetic actuator 98. This arrangement ensures that the inner magnetic pole surfaces 148, 152 and the outer magnetic pole surfaces 156', 142', 144 are opposed to each other over an increased circumferential length and with an increased overall area about the central axis of the electromagnetic actuator 98, and cooperate to generate a relatively large electromagnetic drive force as the output power of the electromagnetic actuator 98. Thus, the electromagnetic actuator 98 can effectively generate a relatively large oscillating force applied to the oscillating member 93, while being made compact in overall size.

Moreover, the power output rod 170 is firmly fitted into the drive rod 172 over an entire circumference, thus preventing an axial displacement of the power output rod 170 relative to the drive rod 172, while preventing a displacement of the power output rod 170 relative to the drive rod 172 in a direction in which the power output rod 170 and the drive rod 172 are subjected to bending stress. As a result, the drive force generated by the electromagnetic actuator 98 is transmitted to the oscillating member 93 with high efficiency and with high accuracy. Therefore, the engine mount 10 of the present embodiment is capable of controlling accurately the oscillation of the oscillating member 93, while assuring high-energy efficiency. Thus, the engine mount 10 can exhibits a desired vibration damping effect with improved efficiency and stability.

The engine mount 10 of the present embodiment eliminates a need for a fastening member, e.g., a pin, which is adapted to be fixed to the connecting portion between the power output rod 170 and the drive rod 172. This makes it possible to reduce the number of components of the engine mount 10, and to simplify the structure of the engine mount 10.

While the presently preferred embodiment of this invention have been described in detail, for illustrative purpose only, it is to be understood that the present invention is not limited to the details of the illustrated embodiments, but may be otherwise embodied.

The principle of the present invention is equally applicable to a cylindrical fluid-filled vibration damping device including an inner shaft member functioning as a first mounting member and an outer sleeve member functioning as a second mounting member, which is disposed radially outwardly of the inner shaft member with a suitable radial spacing therebetween, and an elastic body which is interposed between the inner shaft member and the outer sleeve member so as to elastically connect these two members, and which partially define a fluid chamber between these two members. Such a cylindrical fluid-filled vibration-damping device is suitably used for a front engine front driving (FF) vehicle. JP-A-11-257414 discloses an example of such a cylindrical fluid-filled vibration-damping device.

The structure of the power output rod and the drive rod are not particularly limited to those in the illustrated embodiment. For instance, the power output rod of the electromagnetic actuator and the drive rod of the oscillating member are superposed on each other in a radial direction perpendicular to their axial direction, and fastened with each other by means of an engaging shaft member such as a rivet or a bolt, which extends through a portion in which the power output rod and the drive rod are superposed on each other. Alternatively, the power output load of the electromagnetic actuator and the drive rod of the oscillating member are butted on each other in the axial direction, and are fixedly connected to each other by means of a bolt extending in the axial direction.

The engine mount 10 of the present embodiment may be modified such that the oscillating chamber 95 partially defined by the oscillating member 93 is formed substantially independently of the pressure receiving chamber 72, and the oscillating chamber 95 is held in fluid communication with the pressure receiving chamber through a second orifice passage. In this case, the second orifice passage is tuned so that the engine mount 10 can exhibit additional vibration damping effect on the basis of resonance of the fluid flowing through the second orifice passage.

While the equilibrium chamber 74 is formed on one of opposite side of the oscillating member 93, which is remote from the oscillating chamber 95 formed on the other side of the oscillating member 93, in the illustrated embodiment, the equilibrium chamber 74 is not essential to practice the present invention.

It is also to be understood that the present invention may be embodied with various other changes, modification sand improvements, which may occur to those skilled in the art, without departing from the spirit and scope of the invention defined in the following claims.

What is claimed is:

1. A fluid-filled active vibration damping device comprising:
   a first and a second mounting member that are spaced apart from each other;
   an elastic body elastically connecting said first and second mounting members and partially defining a fluid chamber filled with a non-compressible fluid;
   an oscillating member partially defining said pressure-receiving chamber on one of opposite sides thereof;
   an electromagnetic actuator disposed on an other one of said opposite sides of said oscillating member and adapted to oscillate said oscillating member so as to control a pressure of said non-compressible fluid in said fluid chamber, said electromagnetic actuator includes: a coil having a bore; a yoke member made of a magnetic material and disposed in said bore of said coil so as to extend through said bore and protrudes axially outwardly from axially opposite end faces of said coil so as to form circumferentially extending magnetic pole portions on axially opposite sides of said coil; an oscillating sleeve member made of a magnetic material that is disposed radially outwardly of said yoke member with a given radial spacing therebetween such that said yoke member and said oscillating sleeve member are displaceable relative to each other in an axial direction of said electromagnetic actuator, said oscillating sleeve member being adapted to form at least one annular attractive portion; and an elastic support member for elastically positioning said oscillating sleeve member and said yoke member relative to each other in said axial direction, such that said at least one annular attractive portion of said oscillating sleeve member is opposed to at least one of said magnetic pole portions in a radial direction perpendicular to said axial direction, and is offset from each other in said axial direction, when said coil is in a non-energized state, said coil being energized in order to apply an axial driving force between said yoke member and said oscillating sleeve member on the basis of a magnetic force acting between said magnetic pole portions and said annular attractive portion mutually opposed to each other in said radial direction and offset from each other in said axial direction, and
   a cup-shaped retainer fixed to said second mounting member and adapted to accommodate said electromagnetic actuator such that said electromagnetic actuator extends in a direction in which said oscillating member is reciprocatory oscillated, said annular attractive portion is fixedly connected to said oscillating member on one of axially opposite sides of said electromagnetic actuator, and said yoke member is fixedly connected to a bottom wall portion of said retainer on an other one of said axially opposite side of said electromagnetic actuator such that said yoke member extends through said bottom wall portion of said retainer.

2. A fluid-filled active vibration damping device according to claim 1, wherein said electromagnetic actuator further includes a power output shaft that protrudes on a center axis of said vibration damping device from said annular attractive portion toward said oscillating member, and said oscillating member further includes a drive shaft that protrudes on said center axis of said vibration damping device from said oscillating member toward said electromagnetic actuator,
   one of said drive shaft and said power output shaft being fitted on and caulked inwardly against an other one of said drive shaft and said power output shaft in a direction perpendicular to said center axis of said vibration damping device, whereby said oscillating member and said annular attracting portion of said electromagnetic actuator are fixedly connected to each other.

3. A fluid-filled active vibration damping device according to claim 1, wherein said electromagnetic actuator further includes a power output shaft that protrudes on a center axis of said vibration damping device from said annular attractive portion toward said oscillating member, and said oscillating member further includes a drive shaft that protrudes on said center axis of said vibration damping device from said oscillating member toward said electromagnetic actuator,
   said drive shaft and said power output shaft being superposed on each other in a direction perpendicular to said center axis of said vibration damping device and fastened together by means of an engaging shaft member extending therethrough, whereby said oscillating member and said annular attracting portion of said electromagnetic actuator are fixedly connected to each other.

4. A fluid-filled active vibration damping device according to claim 1, wherein said elastic support member comprises a pair of metallic leaf springs each having a disk like shape, which are disposed on axially opposite sides of said electromagnetic actuator so as to extend in a radial direction perpendicular to an axial direction of said electromagnetic actuator between said yoke member and said oscillating sleeve member, each of said pair of metallic leaf springs being fixed at an inner peripheral portion thereof to said yoke member and at an outer peripheral portion thereof to said oscillating sleeve member.

5. A fluid-filled active vibration damping device according to claim 1, wherein said yoke member includes a bore open in an end face of one of axially opposite end portions thereof that extends through and fixed to said bottom wall portion of said retainer, said bore being adapted to accommodate a lead wire connected to said coil for applying an electric current to the coil.

6. A fluid-filled active vibration damping device according to claim 5, wherein said oscillating sleeve member further includes an upper wall portion disposed at one of axially opposite open end portions thereof that is located on the side of said oscillating member, said power output shaft being fixedly disposed on a central portion of said upper wall portion so as to protrude toward the oscillating member, and wherein said bore of said inner yoke member extends over an entire axial length of said inner yoke member and is opposed at one of axially opposite ends thereof located on the side of said oscillating member to said upper wall portion of said oscillating sleeve member, said one of axially opposite ends of said bore of said inner yoke member being provided with a buffing member fixed thereto.

7. A fluid-filled active vibration damping device according to claim 1, wherein said second mounting member includes a cylindrical portion, one of axially opposite open ends of said cylindrical portion being opposed to said first mounting member with a spacing therebetween and being fluid-tightly closed by said elastic body elastically connecting said first and second mounting member together, and an other one of said axially opposite open ends of said cylindrical portion being fluid-tightly closed by a flexible diaphragm which is easily deformable, said oscillating member being axially movably supported by an axially intermediate portion of said cylindrical portion of said second mounting member such that said fluid chamber is divided into a pressure receiving chamber partially defined by said elastic body and formed on one of axially opposite sides of said oscillating member and an equilibrium chamber partially defined by said flexible diaphragm and formed on an other one of axially opposite sides of said oscillating member, said fluid-filled active vibration damping device further comprising an orifice passage for fluid communication between said pressure receiving chamber and said equilibrium chamber and a connecting member fluid-tightly fixed to and extending through said flexible diaphragm, and wherein said electromagnetic actuator is disposed on one of opposite sides of said flexible diaphragm remote from said equilibrium chamber, and said retainer supporting said electromagnetic actuator is fixed at an open end portion thereof to said other one of said axially opposite open end of said cylindrical portion of said second mounting member, while said connecting member is fixed at one of opposite end portions thereof protruding toward said equilibrium chamber to said oscillating member and at an other one of opposite end portions protruding toward said electromagnetic actuator to said oscillating sleeve member of said electromagnetic actuator.

8. A fluid-filled active vibration damping device according to claim 7, further comprising a partition structure supported by said cylindrical portion of said second mounting member and fluid-tightly dividing said fluid chamber into said pressure receiving chamber formed on one of opposite side thereof and said equilibrium chamber formed on an other one of said opposite side thereof, said partition structure including a circumferential groove partially defining said orifice passage, and a central recess open to said equilibrium chamber, wherein said oscillating member is accommodated in said central recess of said partition member such that said oscillating member is spaced apart from a bottom wall of said central recess with a given axial distance spacing therebetween and is supported by a side wall of said central recess, and such that said oscillating member is brought into abutting contact with said bottom wall portion of said central recess for limiting an amount of displacement of said oscillating member toward said pressure receiving chamber, said bottom wall portion being formed with at least one through hole for fluid communication between the pressure receiving chamber and said equilibrium chamber.

9. A method of producing a fluid-filled active vibration damping device including: a first and a second mounting member that are spaced apart from each other; an elastic body elastically connecting said first and second mounting members and partially defining a fluid chamber filled with a non-compressible fluid; an oscillating member partially defining said fluid chamber on one of opposite sides thereof; an electromagnetic actuator disposed on an other one of said opposite sides of said oscillating member and adapted to oscillate said oscillating member so as to control a pressure of said non-compressible fluid in said fluid chamber, said electromagnetic actuator includes: a coil having a bore; a yoke member made of a magnetic material and disposed in said bore of said coil so as to extend through said bore and protrudes axially outwardly from axially opposite end faces of said coil so as to form circumferentially extending magnetic pole portions on axially opposite sides of said coil; an oscillating sleeve member made of a magnetic material that is disposed radially outwardly of said yoke member with a given radial spacing therebetween such that said yoke member and said oscillating sleeve member are displaceable relative to each other in an axial direction of said electromagnetic actuator, said oscillating sleeve member being adapted to form at least one annular attractive portion; and an elastic support member for elastically positioning said oscillating sleeve member and said yoke member relative to each other in said axial direction, such that said at least one annular attractive portion of said oscillating sleeve member is opposed to at least one of said magnetic pole portions in a radial direction perpendicular to said axial direction, and is offset from each other in said axial direction, when said coil is in a non-energized state, said coil being energized in order to apply an axial driving force between said yoke member and said oscillating sleeve member on the basis of a magnetic force acting between said magnetic pole portions and said annular attractive portion mutually opposed to each other in said radial direction and offset from each other in said axial direction, and a cup-shaped retainer fixed to said second mounting member and adapted to accommodate said electromagnetic actuator such that said electromagnetic actuator extends in a direction in which said oscillating member is reciprocatory oscillated, said annular attractive portion is fixedly connected to said oscillating member on one of axially opposite sides of said electromagnetic actuator, and said yoke member is fixedly connected to a bottom wall portion of said retainer on an other one of said axially opposite side of said electromagnetic actuator such that said yoke member extends through said bottom wall portion of said retainer, wherein said first and said second mounting member and said elastic body and said fluid chamber cooperate to form a mounting assembly of said vibration damping device, said method comprising the steps of:

preparing said mounting assembly and said electromagnetic actuator independently of each other;

fixedly connecting said oscillating sleeve member of said electromagnetic actuator to said oscillating member of said mounting assembly;

assembling said retainer with respect to said electromagnetic actuator such that said retainer is disposed radially outwardly of said electromagnetic actuator; and then fixing said retainer to a fixing member of said second mounting member and said yoke member of said electromagnetic actuator to said bottom-wall portion of said retainer such that said yoke member extends through said bottom wall portion of said retainer.

* * * * *